(12) United States Patent
Wei et al.

(10) Patent No.: US 6,711,010 B2
(45) Date of Patent: Mar. 23, 2004

(54) MEMORY CARD EJECTING STRUCTURE

(75) Inventors: Ti-Li Wei, Panchiao (TW); Chun-Jung Tsai, Hsi Chih (TW); Chun-Jen Chen, Taipei (TW)

(73) Assignee: Wieson Electronic Co., Ltd., Taipei Hsien (TW)

( * ) Notice: Subject to any disclaimer, the term of this patent is extended or adjusted under 35 U.S.C. 154(b) by 188 days.

(21) Appl. No.: 10/095,942

(22) Filed: Mar. 13, 2002

(65) Prior Publication Data

US 2003/0174548 A1 Sep. 18, 2003

(51) Int. Cl.⁷ .................................................. G06F 1/16
(52) U.S. Cl. ........................ 361/684; 361/683; 361/686
(58) Field of Search ................................ 361/683, 684, 361/686

(56) References Cited

U.S. PATENT DOCUMENTS

| | | | |
|---|---|---|---|
| 5,692,208 A | * | 11/1997 | Felcman et al. ............. 361/683 |
| 5,793,607 A | * | 8/1998 | Karidis et al. .............. 361/684 |
| 5,889,649 A | * | 3/1999 | Nabetani et al. ............ 361/684 |
| 6,125,034 A | * | 9/2000 | Bovio et al. ................ 361/686 |

* cited by examiner

*Primary Examiner*—Darren Schuberg
*Assistant Examiner*—Yean-Hsi Chang
(74) *Attorney, Agent, or Firm*—Bacon & Thomas, PLLC

(57) ABSTRACT

A memory card ejecting structure includes an electrically insulative frame base, the frame base having a receiving unit mounted with a set of terminals for receiving a memory card and two arms forwardly extended from two opposite lateral sides of the receiving unit, the receiving unit having an endless guide groove, an ejecting member slidably mounted in the frame base and adapted for ejecting the inserted memory card out of the receiving unit, and a spring member connected between the ejecting member and one arm of the frame base, the spring member having an angled locating wire rod backwardly extended from a rear end ring thereof and positioned in the endless guide groove to hold the spring member between a stretched position and a released position.

7 Claims, 8 Drawing Sheets

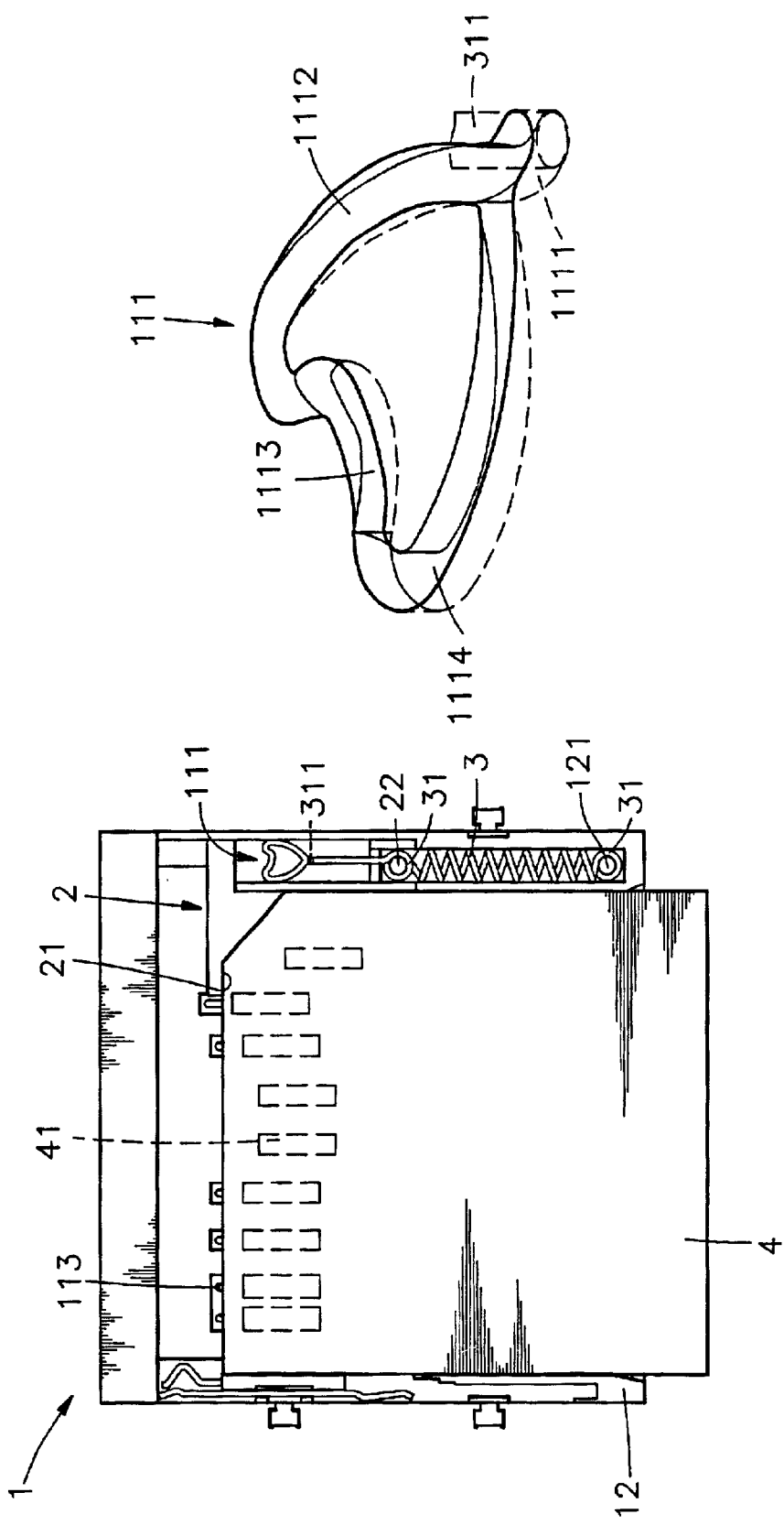

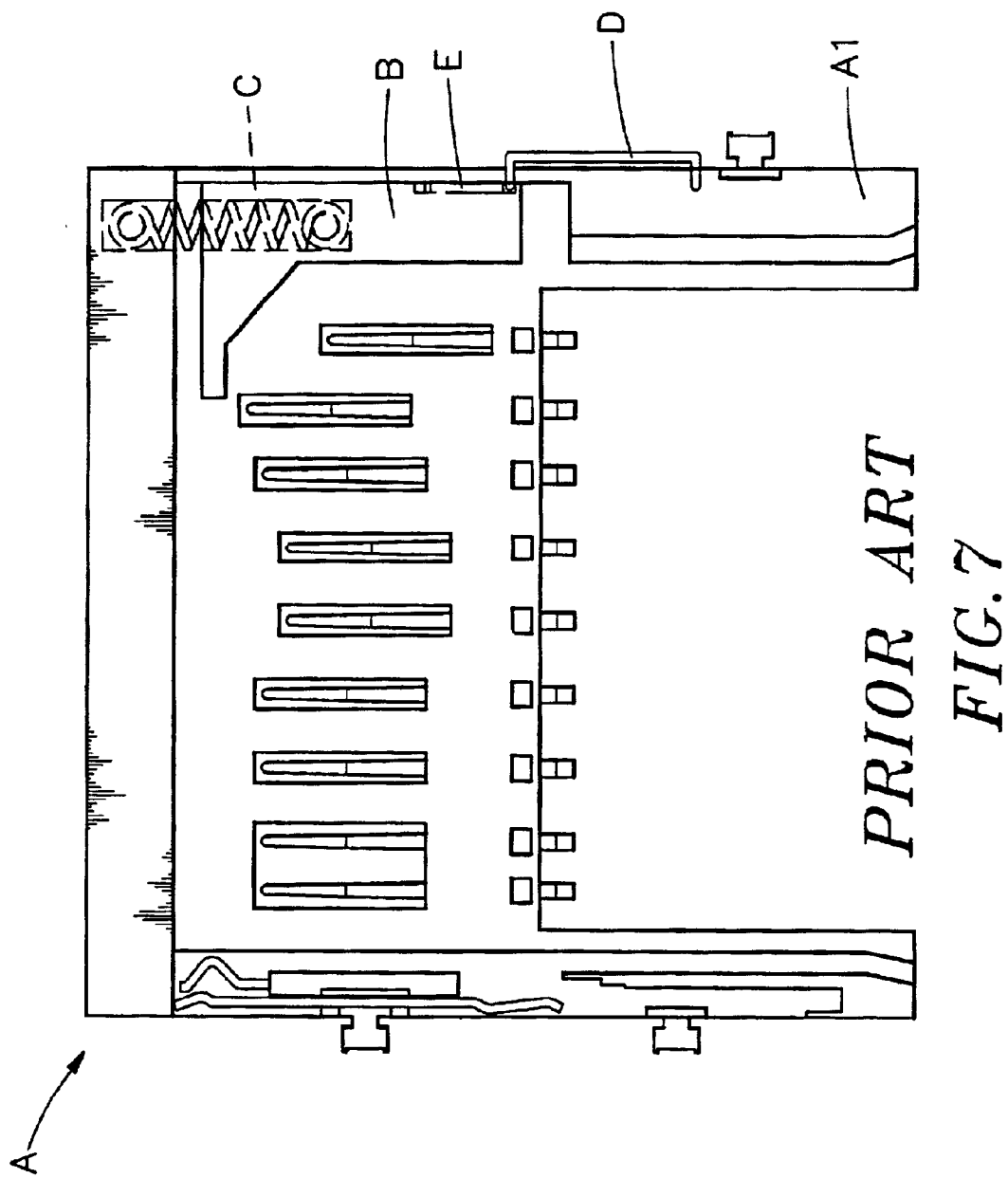

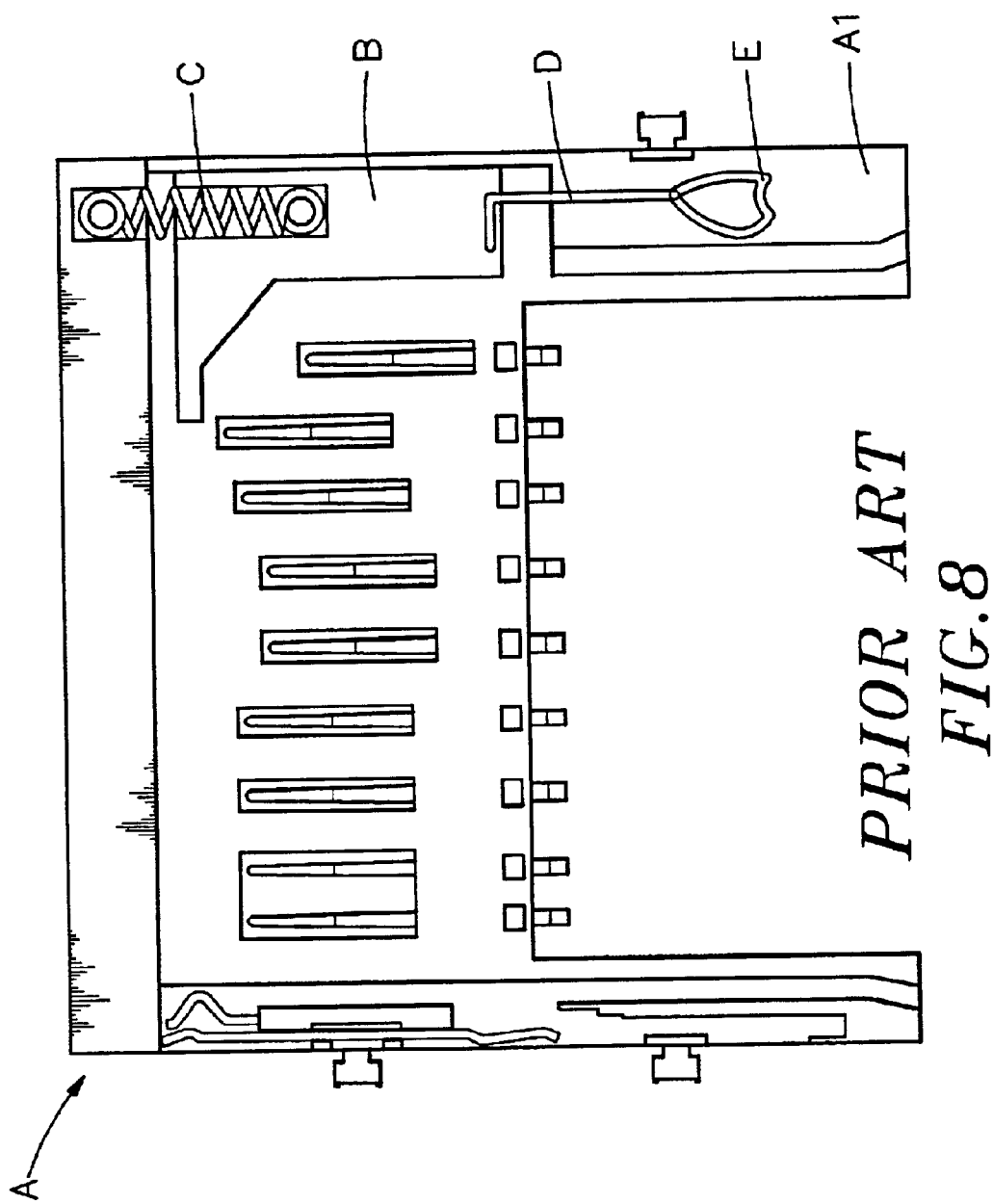

MEMORY CARD EJECTING STRUCTURE

BACKGROUND OF THE INVENTION

1. Field of the Invention

The present invention relates to a memory card connector and, more specifically, to a memory card ejecting structure used in a memory card connector for ejecting the installed memory card out of the memory card connector.

2. Description of the Related Art

Advanced and sophisticated computers have been continuously developed. In order to extend the functions of a computer, PDA (personal digital assistant), etc, different interface cards, for example, memory cards, network cards, modem cards, SCSI (small computer system interface) cards may be used. Regular memory cards are commonly made subject to PCMCIA (Personal Computer Memory Card International Association) standard. Most notebook computers provide plug and play function and/or hot plug function. Nowadays, commercially available memory cards include MMCs (Multi Media Cards), CFs (Compact Flash Cards), SM (Smart Media Cards), MSs (Memory Sticks), and SDs (Secure Digital Memory Cards). A memory card connector has a memory card ejecting structure adapted for ejecting the loaded memory card out of the connector body. FIG. 6 shows a memory card ejecting structure according to the prior art. According to this design, the memory card ejecting structure comprises an electrically insulative frame base A having two parallel arms A1 at two sides, an ejecting member B adapted for ejecting the loaded memory card out of the frame base A, a spring member C coupled between one arm A1 and the ejecting member B, and a guide rod D, which has a rear end fixedly fastened to the rear side of the frame base A and a front end coupled to a guide groove E in the ejecting member B. This design is still not satisfactory in function. Because the guide rod D and the spring member C are separated small members, the use of the guide rod D and the spring member C complicates the installation procedure of the memory card ejecting structure and greatly increases its manufacturing cost. FIG. 7 shows another design of memory card ejecting structure according to the prior art. According to this design, the memory card ejecting structure comprises an electrically insulative frame base A having two parallel arms A1 at two sides, an ejecting member B adapted for ejecting the loaded memory card out of the frame base A, a spring member C coupled between the frame base A and the ejecting member B, and a guide rod D fixedly fastened to one arm A1 of the frame base. The ejecting member B has a guide groove E coupled to the guide rod D. This design of memory card ejecting structure still has drawbacks. Because the ejector member B, the spring member C, and a guide rod D are respectively disposed at one lateral side of the frame base A, the frame base A must be have having a certain width. Further, the complicated structural design greatly increases the manufacturing cost. FIG. 8 shows still another design of memory card ejecting structure according to the prior art. According to this design, the memory card ejecting structure comprises an electrically insulated frame base A having two parallel arms A1 at two sides, an ejecting member B adapted for ejecting the loaded memory card out of the frame base A, a spring member C coupled between the frame base A and the ejecting member B, and a guide rod D, which has a rear end fixedly fastened to the front side of the ejecting member B and a front end coupled to a guide groove E in one arm A1 of the frame base A for guiding movement of the ejecting member B. This design is also complicated, resulting in high manufacturing cost.

SUMMARY OF THE INVENTION

The present invention has been accomplished to provide a memory card ejecting structure, which eliminates the aforesaid drawbacks. It is one object of the present invention to provide a memory card ejecting structure, which is easy to assemble. It is another object of the present invention to provide a memory card ejecting structure, which is stable and positive in use. It is still another object of the present invention to provide a memory card ejecting structure, which is easy and inexpensive to manufacture. According to one aspect of the present invention, the memory card ejecting structure comprises an electrically insulative frame base, the frame base having a receiving unit mounted with a set of terminals for receiving a memory card and two arms forwardly extended from two opposite lateral sides of the receiving unit, the receiving unit having an endless guide groove, an ejecting member slidably mounted in the frame base and adapted for ejecting the inserted memory card out of the receiving unit, and a spring member connected between the ejecting member and one arm of the frame base, the spring member having an angled locating wire rod backwardly extended from a rear end ring thereof and positioned in the endless guide groove to hold the spring member between a stretched position and a released position. According to another aspect of the present invention, the receiving unit of the frame base has a sliding slot, and the ejecting memory has a guide block inserted into the sliding slot of the frame base for guiding movement of the ejecting member.

BRIEF DESCRIPTION OF THE DRAWINGS

FIG. 4 is a top view of the present invention showing the memory card partially inserted into the receiving unit of the electrically insulative frame base.

FIG. 4A is a perspective view in an enlarged scale of a part of FIG. 4, showing the angled locating wire rod of the spring member positioned in the start end of the endless guide groove.

FIG. 7 is a top plain view of another design of memory card ejecting structure according to the prior art.

FIG. 8 is a top plain view of still another design of memory card ejecting structure according to the prior art.

DETAILED DESCRIPTION OF THE PREFERRED EMBODIMENT

Figure 1:
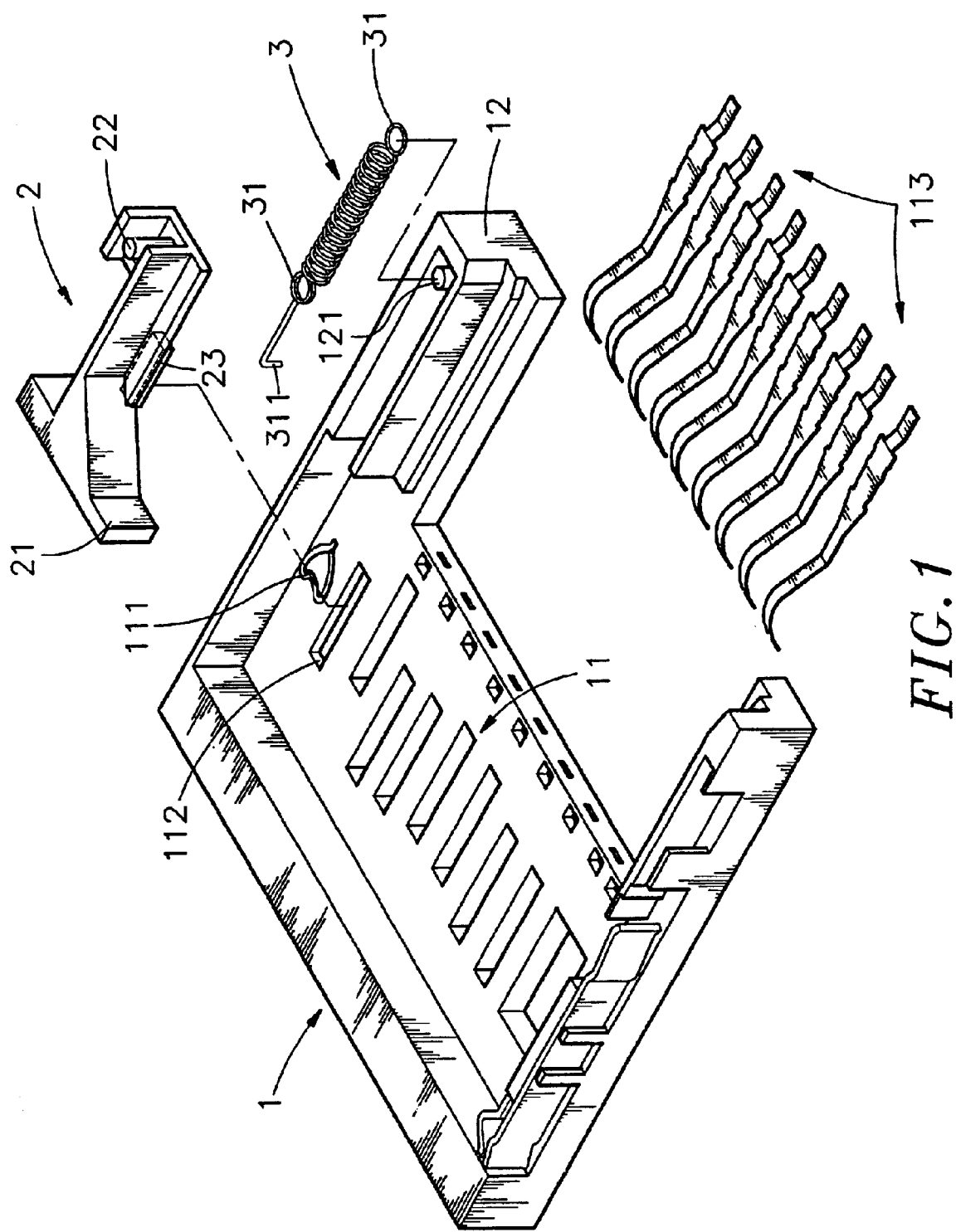
FIG. 1 is an exploded view of a memory card ejecting structure according to the present invention.
Figure 2:
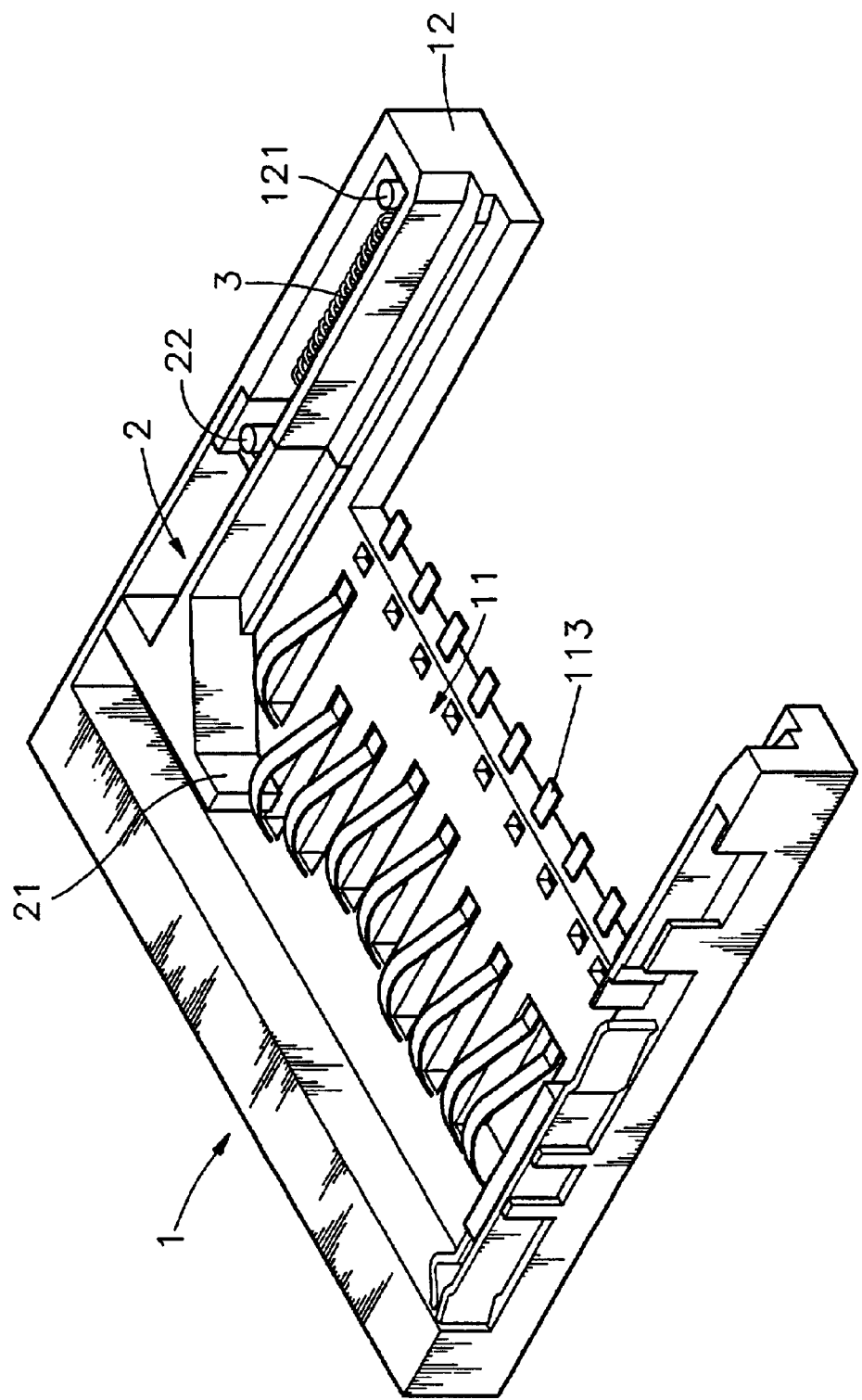
FIG. 2 is an elevational assembly view of the memory card ejecting structure according to the present invention.
Figure 3:
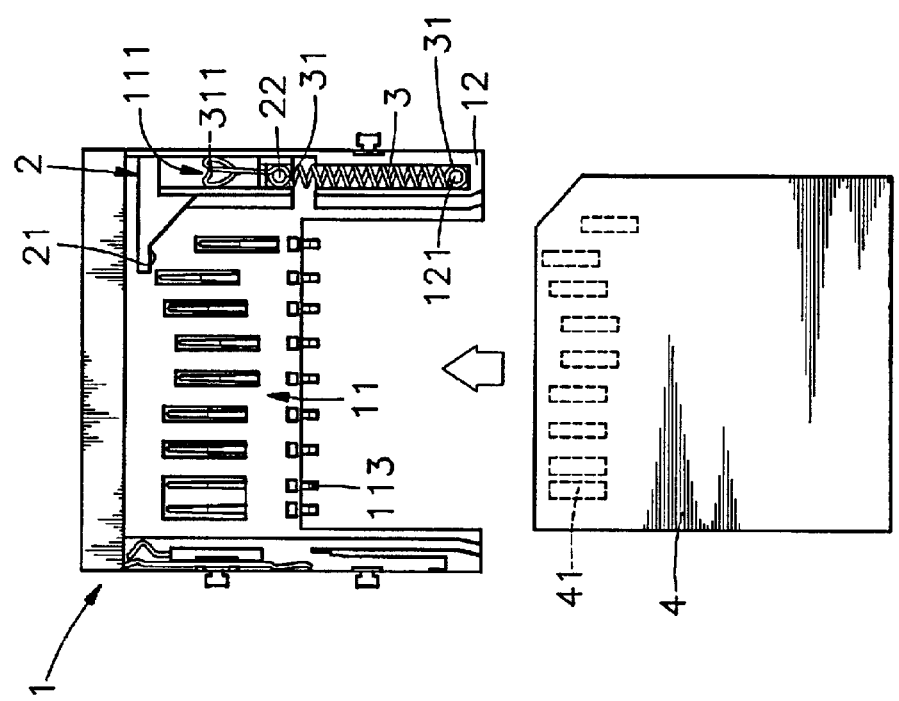
FIG. 3 is a schematic drawing of the present invention before the insertion of the memory card into the receiving unit of the electrically insulative frame base.

Referring to FIGS. 1, 2, 3, and 4A, a memory card ejecting structure is shown comprised of an electrically insulative frame base 1, a ejecting member 2, and a spring member 3.

The electrically insulative frame base 1 comprises a receiving unit 11 adapted for receiving a memory card, a set of terminals 113 installed in the receiving unit 11, two arms 12 formed integral with and forwardly extended from two opposite lateral sides of the receiving unit 11 and arranged in parallel, and an upright locating rod 121 disposed in the free end of one arm 12. The receiving unit 11 comprises an endless guide groove 111 disposed at one side near one arm 12, and a sliding slot 112 disposed adjacent to the endless guide groove 111 and in parallel to the arms 12. The endless groove 111 comprises a start end 1111, a first sliding way 1112 gradually upwardly extended from the start end 1111, a positioning portion 1113 gradually upwardly extended from one end of the first sliding way 1112 remote from the start end 1111 and tilted in one direction, and a second sliding way 1114 extended from one end of the positioning portion 1113 remote from the first sliding way 1112 and terminating in the start end 1111. The ejecting member 2 comprises a transversely extended rear stop plate 21, an upright front locating rod 22, and a downwardly protruded middle guide block 23. The spring member 3 is a tension spring having two end rings 31 respectively extended from two ends thereof and a locating wire rod 311 extended from one end ring 31. The locating wire rod 311 is an angled wire rod having a rear end turned downwards for positioning in the endless guide groove 111.

The ejecting member 2 is slidably mounted in the receiving unit 11 of the electrically insulative frame base 1 behind one arm 12 with the downwardly protruded middle guide block 23 inserted into the sliding slot 112. The spring member 3 in one arm 12 with the end rings 31 respectively hung on the upright locating rod 121 of the electrically insulative frame base 1 and the upright front locating rod 22 of the ejecting member 2 and the angled locating wire rod 311 rested in the start end 1111 of the endless groove 111.

Figures 5, 5A:
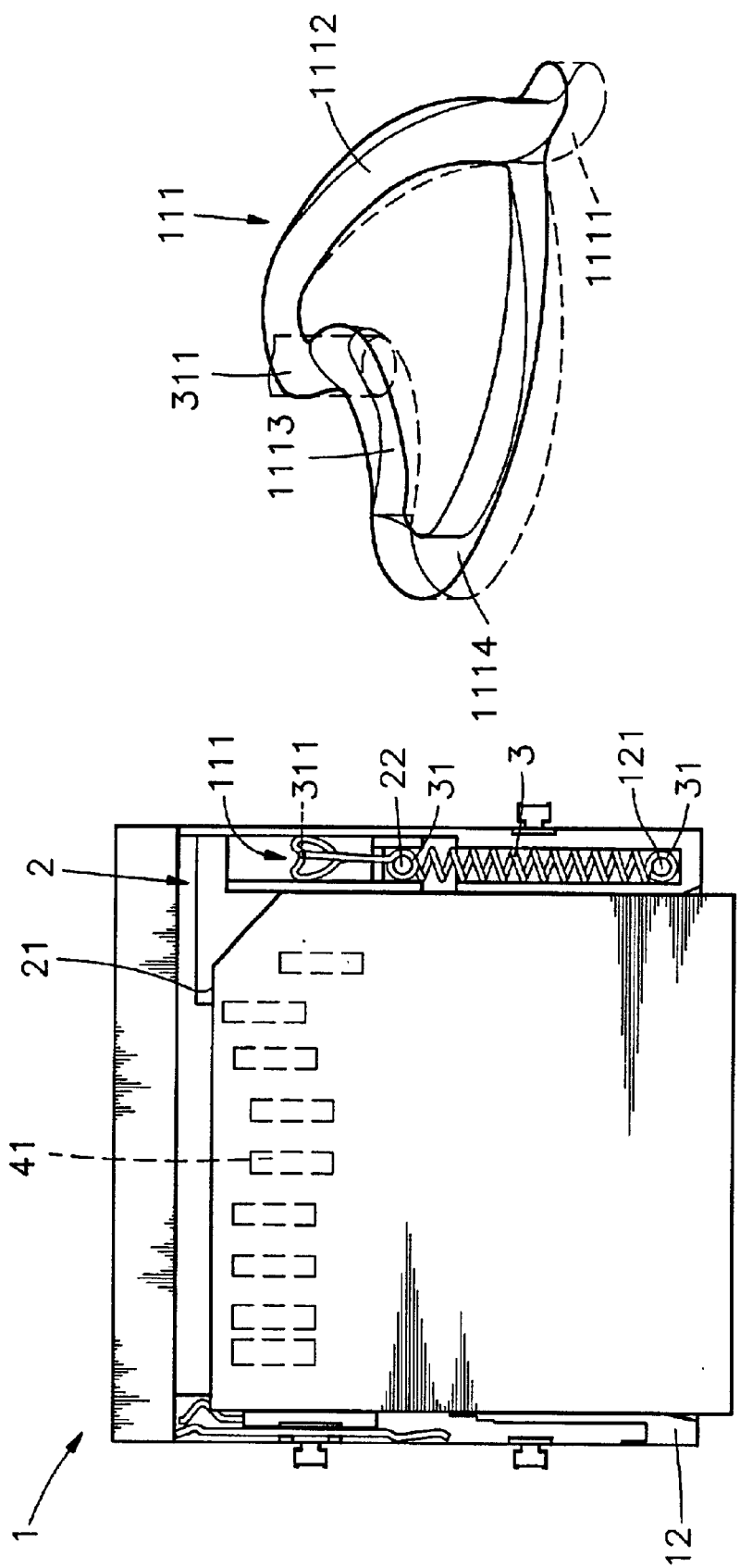
FIG. 5 is a top view of the present invention showing the memory card inserted into the receiving unit of the electrically insulative frame base and set in position.
FIG. 5A is a perspective view in an enlarged scale of a part of FIG. 5 showing the angled locating wire rod of the spring member positioned in the positioning portion of the endless guide groove.
Figure 6:
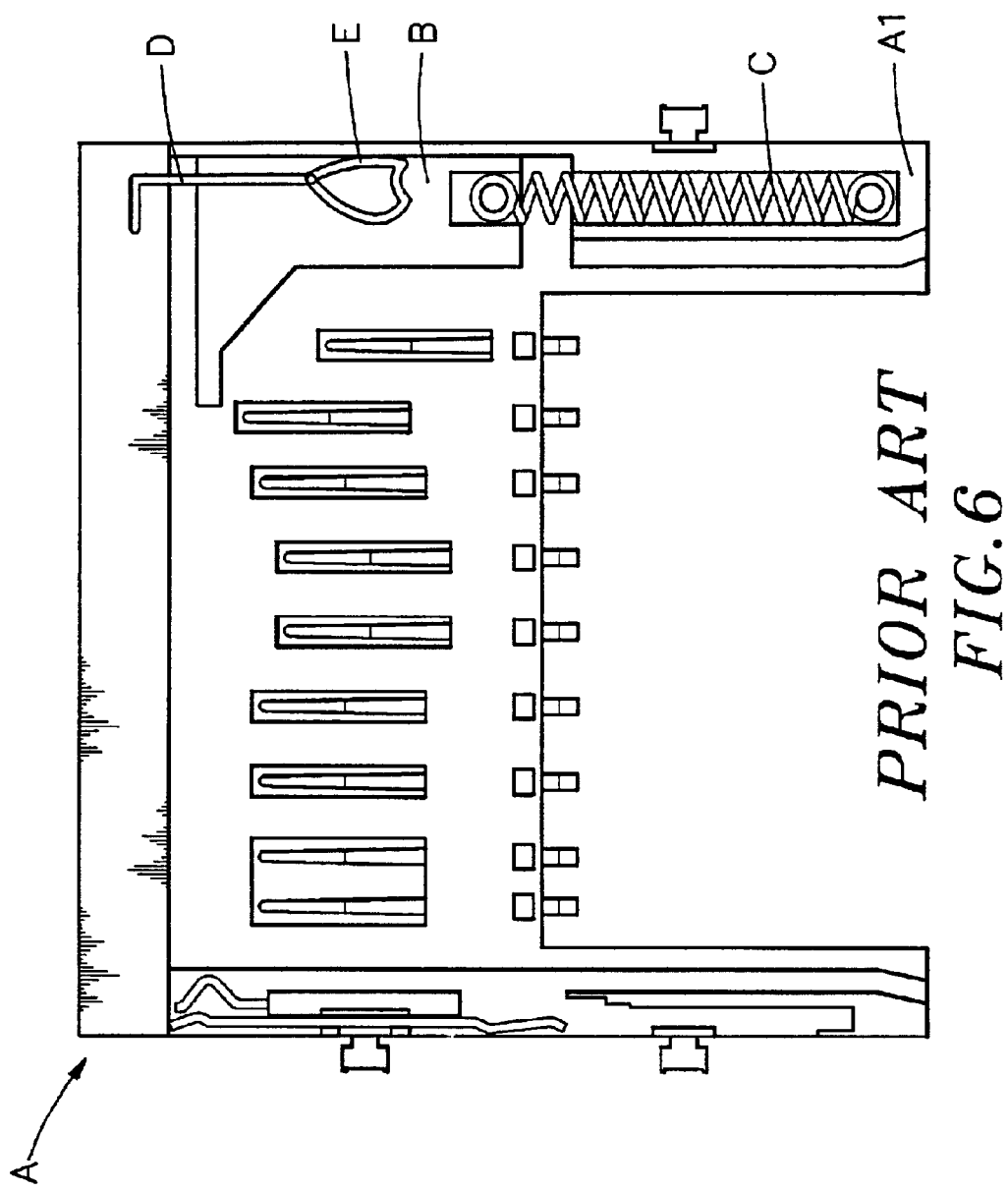
FIG. 6 is a top plain view of a memory card ejecting structure according to the prior art.

Referring to FIGS. 3, 4, 4A, 5, and 5A, when inserting a memory card 4 into the receiving unit 11 of the electrically insulative frame base 1, the memory card 4 pushes the transversely extended stop plate 21 backwards, thereby causing the ejecting member 2 to stretch the spring member 3. When the memory card 4 set into position with the electric contacts 41 thereof disposed in contact with the terminals 113 respectively for enabling the user to access data, the angled locating wire rod 311 is moved from the start end 1111 of the endless groove 111 along the first sliding way 1112 to the positioning portion 1113 and positioned therein to hold the spring member 3 in the stretched condition. When removing the memory card 4 from the electrically insulative frame base 1, push the memory card 4 inwards to move the transversely extended stop plate 21 of the ejecting member 2, causing the ejecting member 2 to stretch the spring member 3 further and to move the angled locating wire rod 311 from the positioning portion 1113 of the endless groove 111 into the second sliding way 1114. When released the hand from the memory card 4, the spring member 3 immediately returns to its former shape to pull the ejecting member 2 forwards, thereby causing the transversely extended stop plate 21 to force the memory card 4 out of the receiving unit 11 of the electrically insulative frame base 1.

A prototype of memory card ejecting structure has been constructed with the features of the annexed drawings of FIGS. 1~5. The memory card ejecting structure functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A memory card ejecting structure comprising an electrically insulative frame base, said electrically insulative frame base comprising a receiving unit adapted for receiving a memory card, and two arms formed integral with and forwardly extended from two opposite lateral sides of said receiving unit and arranged in parallel, said receiving unit having a set of terminals installed therein for the contact of respective electric contacts of the memory card to be inserted into said receiving unit, an ejecting member slidably mounted in said electrically insulative frame base and adapted for ejecting the inserted memory card out of said receiving unit, and a spring member connected between said ejecting member and one arm of said electrically insulative frame base to impart a forward pull force to said ejecting member, wherein said receiving unit of said electrically insulated frame base comprises an endless guide groove disposed at one side adjacent to one arm of said electrically insulative frame base; said spring member comprises a locating wire rod backwardly extended from a rear end ring thereof and positioned in said endless guide groove to hold said spring member between a stretched position and a released position.

2. The memory card ejecting structure as claimed in claim 1, wherein said ejecting member comprises a stop plate transversely disposed at a rear side thereof and adapted for stopping against the memory card inserted into said receiving unit of said electrically insulative frame base.

3. The memory card ejecting structure as claimed in claim 1, wherein said ejecting member comprises an upright locating rod disposed at a front side thereof and coupled to the rear end ring of said spring member.

4. The memory card ejecting structure as claimed in claim 1, wherein said receiving unit of said electrically insulative frame base comprises a sliding slot disposed in parallel to said arms; said ejecting member comprises a guide block downwardly protruded from a middle part thereof and inserted into said sliding slot of said receiving unit for guiding movement of said ejecting member.

5. The memory card ejecting structure as claimed in claim 1, wherein said electrically insulative frame base comprising an upright locating rod disposed in a front end of one of the arms thereof; said spring member comprises a front end ring extended from a front end thereof and coupled to the upright locating rod of said electrically insulative frame base.

6. The memory card ejecting structure as claimed in claim 1, wherein said spring member is a tension spring, and said locating wire rod is an angled wire rod having a rear end turned downwards and positioned in said endless guide groove.

7. The memory card ejecting structure as claimed in claim 1, wherein said endless guide groove comprises a start end, a first sliding way gradually upwardly extended from said start end, a positioning portion gradually upwardly extended from one end of said first sliding way remote from said start end and tilted in one direction, and a second sliding way extended from one end of said positioning portion remote from said first sliding way and terminating in said start end.

* * * * *